US006440288B1

(12) United States Patent
Pyun et al.

(10) Patent No.: US 6,440,288 B1
(45) Date of Patent: Aug. 27, 2002

(54) METHOD FOR PREPARING ANODE ELECTRODE FOR HIGH VOLTAGE ELECTROLYTIC CAPACITOR

(75) Inventors: Su Il Pyun; Woo Jin Lee, both of Seoul (KR)

(73) Assignee: Korea Advanced Institute of Science and Technology, Kwangyeok-si (KR)

( * ) Notice: Subject to any disclaimer, the term of this patent is extended or adjusted under 35 U.S.C. 154(b) by 0 days.

(21) Appl. No.: 09/691,153

(22) Filed: Oct. 19, 2000

(30) Foreign Application Priority Data

Jan. 13, 2000 (KR) .......................................... 2000-1537

(51) Int. Cl.$^7$ .......................... C25D 11/12; H01G 9/055
(52) U.S. Cl. ........................ 205/81; 205/153; 205/175; 205/223; 205/917
(58) Field of Search .......................... 205/81, 139, 153, 205/175, 223, 917, 50

(56) References Cited

U.S. PATENT DOCUMENTS

| | | | | |
|---|---|---|---|---|
| 3,316,164 A | * | 4/1967 | Welch, Jr. ..................... | 204/141 |
| 4,276,129 A | * | 6/1981 | Kahzaki et al. ................ | 204/58 |
| 5,194,127 A | * | 3/1993 | Endoh et al. .......... | 204/129.85 |
| 5,808,857 A | * | 9/1998 | Stevens ....................... | 361/503 |

* cited by examiner

Primary Examiner—Donald R. Valentine
Assistant Examiner—William T. Leader
(74) Attorney, Agent, or Firm—Rosenberg, Klein & Lee

(57) ABSTRACT

Disclosed is a method for forming an aluminum oxide film of a large surface area on an electrode for a high voltage electrolytic capacitor. In accordance with the method, an oxide film of a uniform thickness is formed, prior to a process of etching the oxide film. A re-anodization is then partially conducted for an etched portion of the oxide film. The resultant oxide film has an increased surface area. The method of the invention makes it possible to prepare a dielectric oxide film having characteristics of a uniform thickness and a large surface area. In accordance with the invention, it is possible to expect an increase in the capacitance of electrolytic capacitors.

5 Claims, 6 Drawing Sheets

METHOD FOR PREPARING ANODE ELECTRODE FOR HIGH VOLTAGE ELECTROLYTIC CAPACITOR

BACKGROUND OF THE INVENTION

1. Field of the Invention

The present invention relates to a method for preparing an anode electrode for a high voltage electrolytic capacitor, and more particularly to a method for preparing an anode electrode for a high voltage electrolytic capacitor, in which an oxide film having a uniform thickness and a large surface area is formed on an aluminum electrode to be used as the anode electrode.

2. Description of the Related Art

Generally, an aluminum electrolytic capacitor uses an aluminum foil for an anode material thereof. In such an aluminum electrolytic capacitor, an oxide film is formed, as a dielectric, on the surface of the anode. An organic solvent or solid electrolyte is used as an electrolyte to be provided between electrodes. In order to achieve an increase in capacitance, the dielectric of such an electrolytic capacitor should have a high dielectric constant, a large surface area, and a small thickness.

Typically, conventional methods for preparing an aluminum foil for an electrolytic capacitor involve an etching process for roughing the surface of an aluminum foil having a high purity of 99.9% or more, thereby achieving an increase in the surface area of the aluminum foil, and a formation process for forming a dielectric film on the aluminum foil. In such conventional methods, accordingly, the above mentioned increase in capacitance is achieved by conducting an electrochemical or chemical etching process for the aluminum foil under the condition in which an appropriate element is added to the material of the aluminum foil, or under the condition in which appropriate ions are added to a solution used in the etching process in order to rough the surface of the aluminum foil.

All known methods of increasing the surface of an aluminum electrode used for electrolytic capacitors involve a process for etching the surface of an aluminum foil used for the aluminum electrode prior to the formation of an oxide film on the aluminum foil. In order to rough the surface of the aluminum foil, addition of sulfate ions serving to increase the etchability of the aluminum foil has also been made. However, where an oxide film is formed on the aluminum foil etched using sulfate ions, there is a problem in that it is difficult to expect a desired surface area increase because fine tunnels formed by those sulfate ions are blocked during the formation of the oxide film. Furthermore, the formation of the oxide film must be conducted for a lengthened period of time. For this reason, there is an increase in the moisture content of the oxide film. This requires a lengthened period of time for a dehydration.

U.S. Pat. No. 3,316,164 discloses a method for preparing an aluminum foil having a surface area increased from an initial surface area by 20 times in accordance with an addition of sulfate ions to an NaCl solution. In this method, however, the sulfate ions are absorbed onto the entire surface of the aluminum foil during an etching process, thereby producing a deposit of aluminum hydroxide sulfide on a cathode. Also, U.S. Pat. No. 5,062,025 discloses a method for manufacturing an electrolyte capacitor, in which filaments of aluminum and those of other metals are used in a combined fashion in order to achieve an increase in surface area. The capacitance increased in accordance with an increase in surface area is measured using a well-known universal impedance bridge. However, this method is different from the present invention in terms of the configuration.

SUMMARY OF THE INVENTION

The present invention has been made in view of the above mentioned problems involved in the related art, and an object of the invention is to provide a method for preparing an anode electrode for a high voltage electrolytic capacitor, which is capable of requiring a relatively reduced anodization time, effectively generating a reaction for the formation of tunnels, and maximizing the effect of sulfate ions added, thereby forming an oxide film having a uniform thickness and a large surface area.

In accordance with the present invention, this object is accomplished by providing a method for preparing an anode electrode of a high voltage electrolytic capacitor, comprising the steps of: anodizing an aluminum foil in a boric acid solution, thereby forming an oxide film of a uniform thickness on the aluminum foil; partially etching the aluminum foil, formed with the oxide film, in an NaCl solution containing sulfate ions; and re-anodizing the etched aluminum foil, thereby forming again an oxide film on the etched aluminum foil.

BRIEF DESCRIPTION OF THE DRAWINGS

The above objects, and other features and advantages of the present invention will become more apparent after a reading of the following detailed description when taken in conjunction with the drawings, in which.

DETAILED DESCRIPTION OF THE PREFERRED EMBODIMENTS

Now, preferred embodiments of the present invention will be described in conjunction with the annexed drawings.

The present invention provides a method for preparing an anode electrode of a high voltage electrolytic capacitor, which involves anodizing an aluminum foil in a boric acid solution, thereby forming an oxide film of a uniform thickness on the aluminum foil, partially etching the aluminum foil, formed with the oxide film, in an NaCl solution containing sulfate ions, and re-anodizing the etched aluminum foil, thereby forming again an oxide film on the etched aluminum foil.

In accordance with the present invention, the boric acid used may include a mixed solution of $H_3BO_3$ and $Na_2B_4O_7$. Preferably, the boric acid is a mixed solution containing 0.5 M $H_3BO_3$ and 0.05 M $Na_2B_4O_7$.

The sulfate ions have two functions with respect to a pitting corrosion of aluminum. That is, the sulfate ions serve to suppress a pit initiation, as the first function thereof, and to promote the growth of pits initially formed, as the second function thereof.

Preferably, the sulfate ions are used in a concentration of 0.01 to 0.1 M. Where the sulfate ions concentration used is less than 0.01 M, the function of chloride ions is remarkably exhibited. As a result, it is impossible to expect a well growth of pits even though those pits are formed in a large amount. On the other hand, where the concentration of the sulfate ions is more than 0.1 M, the generation of pits is impossible due to the sulfate ions.

The sodium chloride solution is preferably maintained at a temperature of 25 to 80° C. When the sodium chloride solution is maintained at a temperature of less than 25° C., the activity of the reaction is insufficient. On the other hand, when the sodium chloride solution is preferably maintained at a temperature of more than 80° C., the chloride ions serve to promote the generation of pits beyond an optimum amount of pits.

Figure 1:
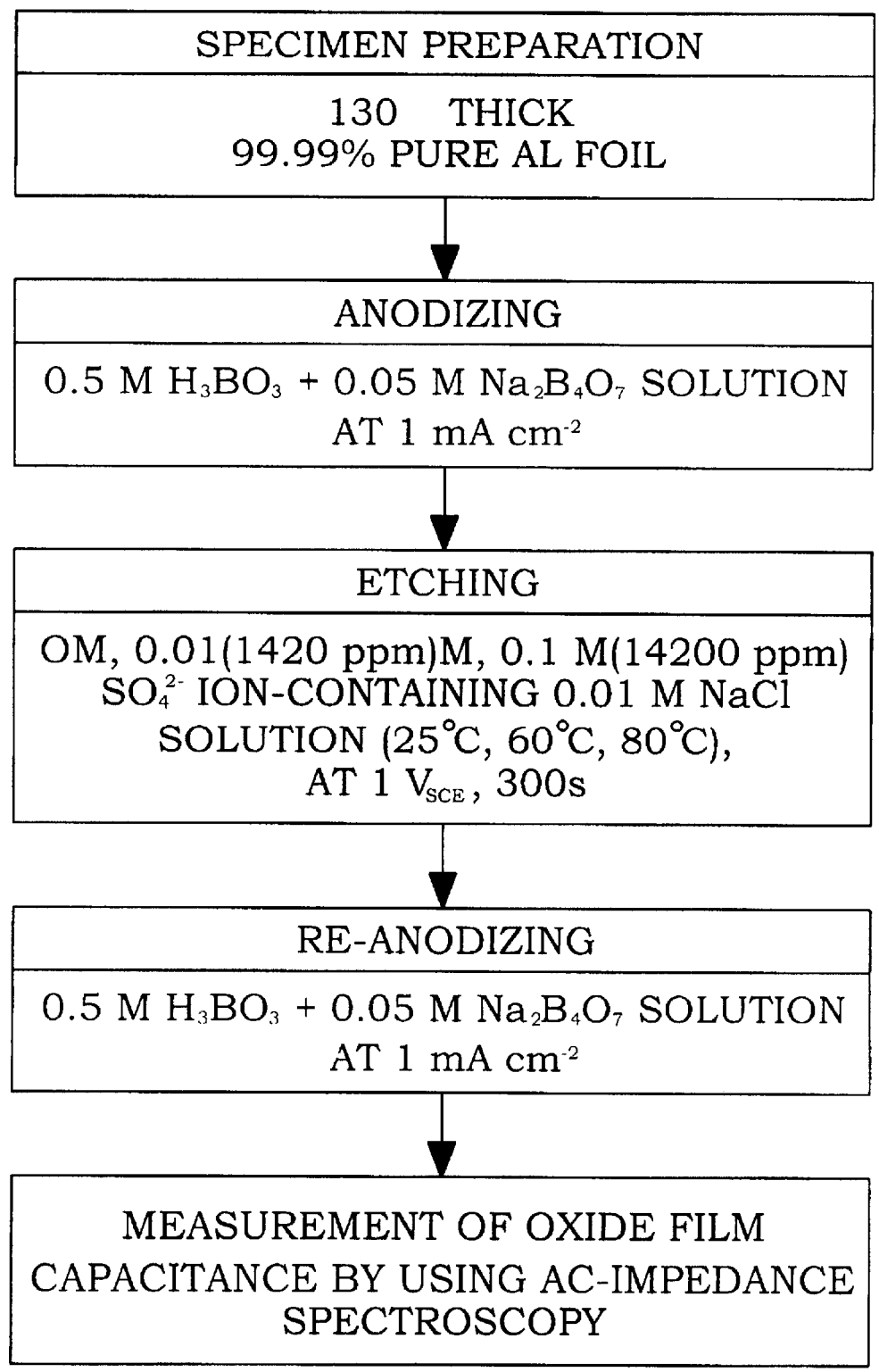
FIG. 1 is a flow chart schematically illustrating sequential processing steps of a method for preparing an anode electrode in accordance with the present invention.

FIG. 1 is a flow chart schematically illustrating sequential processing steps of the method according to the present invention.

In accordance with the present invention, an aluminum foil having a purity of 99.99% or more and a thickness of 130 μm is used to prepare an electrode. This aluminum foil is dipped in a mixed solution of 0.5 M $H_3BO_3$ and 0.05 M $Na_2B_4O_7$. A current density of 1 mA $cm^{-2}$ is applied to the aluminum foil until a formation voltage of 30 V is reached, thereby forming an oxide film on the aluminum foil. This electrode is then subjected to an etching process. In the etching process, a voltage of 1 $V_{SCE}$ is applied to the electrode in a 0.01 M NaCl solution containing sulfate ions while varying being maintained at an appropriate temperature, for 300 seconds. In order to measure a variation in capacitance depending on a variation in the temperature of the NaCl solution and a variation in the concentration of the sulfate ions in the NaCl solution, the etching process is carried out at different temperatures of the NaCl solution, that is, 25° C., 60° C., and 80° C., and in different sulfate lions concentrations, that is, 0 M, 0.01 M (1,420 ppm), and 0.1 M (14,200 ppm), respectively. In order to allow the oxide film to have a uniform thickness, the aluminum foil is subjected to a re-anodization under the same condition as that in the formation of the initial oxide film. The capacitance measurement is conducted using an AC impedance device after the completion of the re-anodization.

Figure 2:
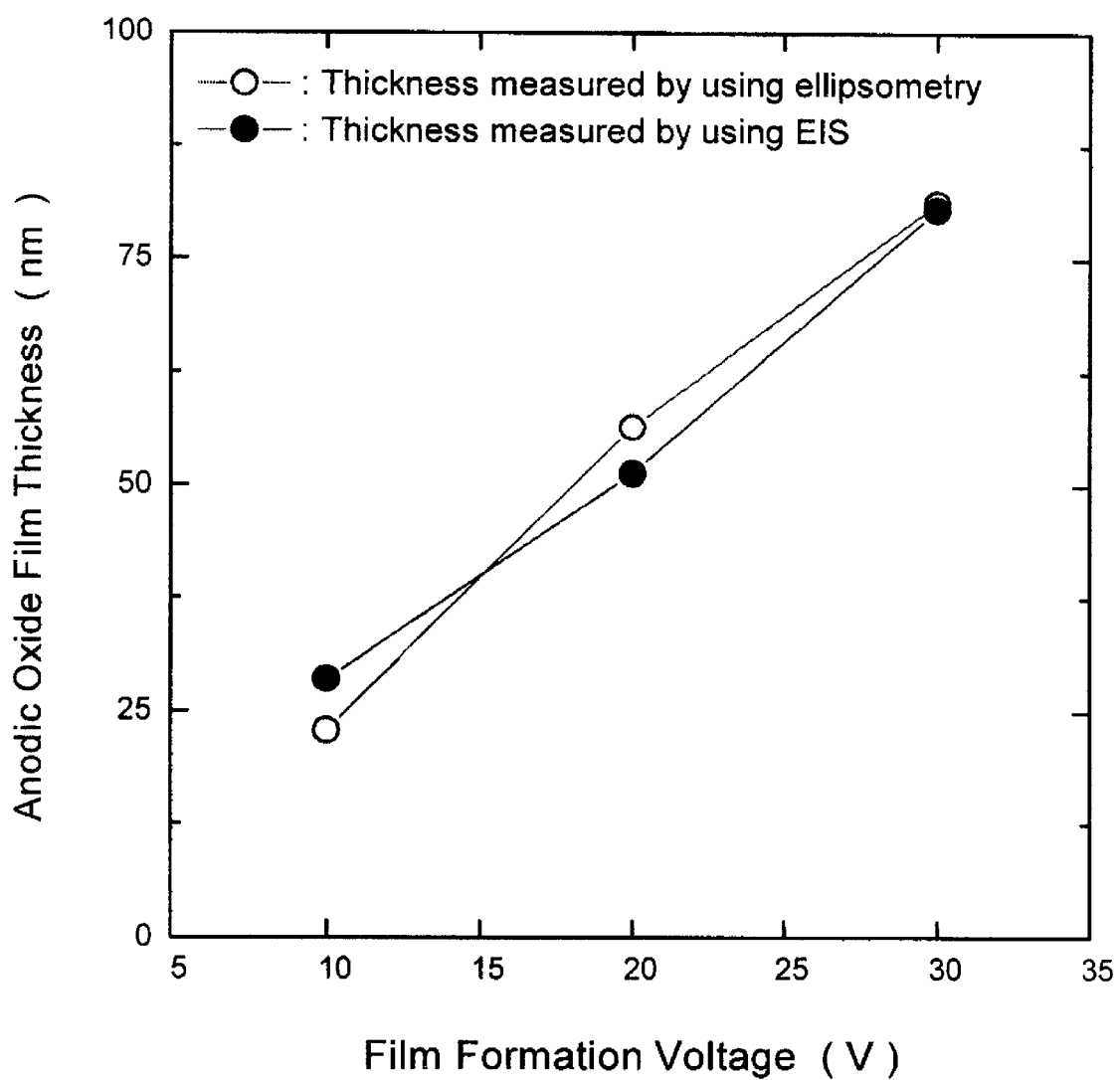
FIG. 2 is a graph depicting a variation in the thickness of an aluminum oxide film depending on a variation in film formation voltage.

FIG. 2 is a graph depicting a variation in the thickness of the aluminum oxide film depending on a variation in film formation voltage, measured using an ellipsometry and an AC impedance method (EIS), respectively. Referring to FIG. 2, it can be found that respective thicknesses of the oxide film formed at different formation voltages of 10 V, 20 V, and 30 V, calculated based on capacitances measured in accordance with the AC impedance method correspond approximately to those directly measured using the ellipsometry. Accordingly, it can be found that the thickness measurement according to the AC impedance method is reliable.

Figure 3:
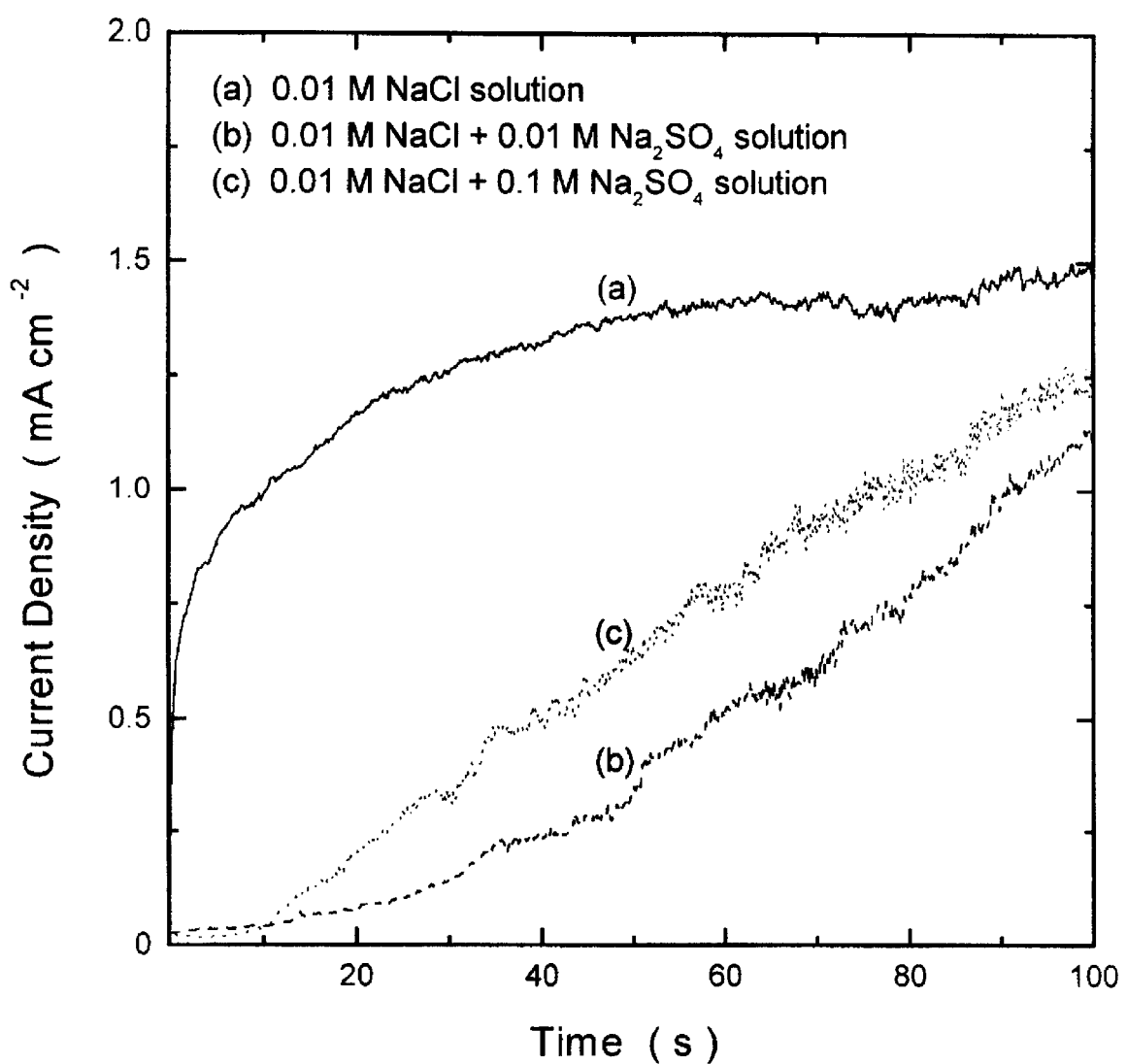
FIG. 3 is a current-to-time curve established when an aluminum electrode formed with an oxide film is etched at an applied anodic potential of +1.0 $V_{SCE}$ and at 25° C.
Figure 4:
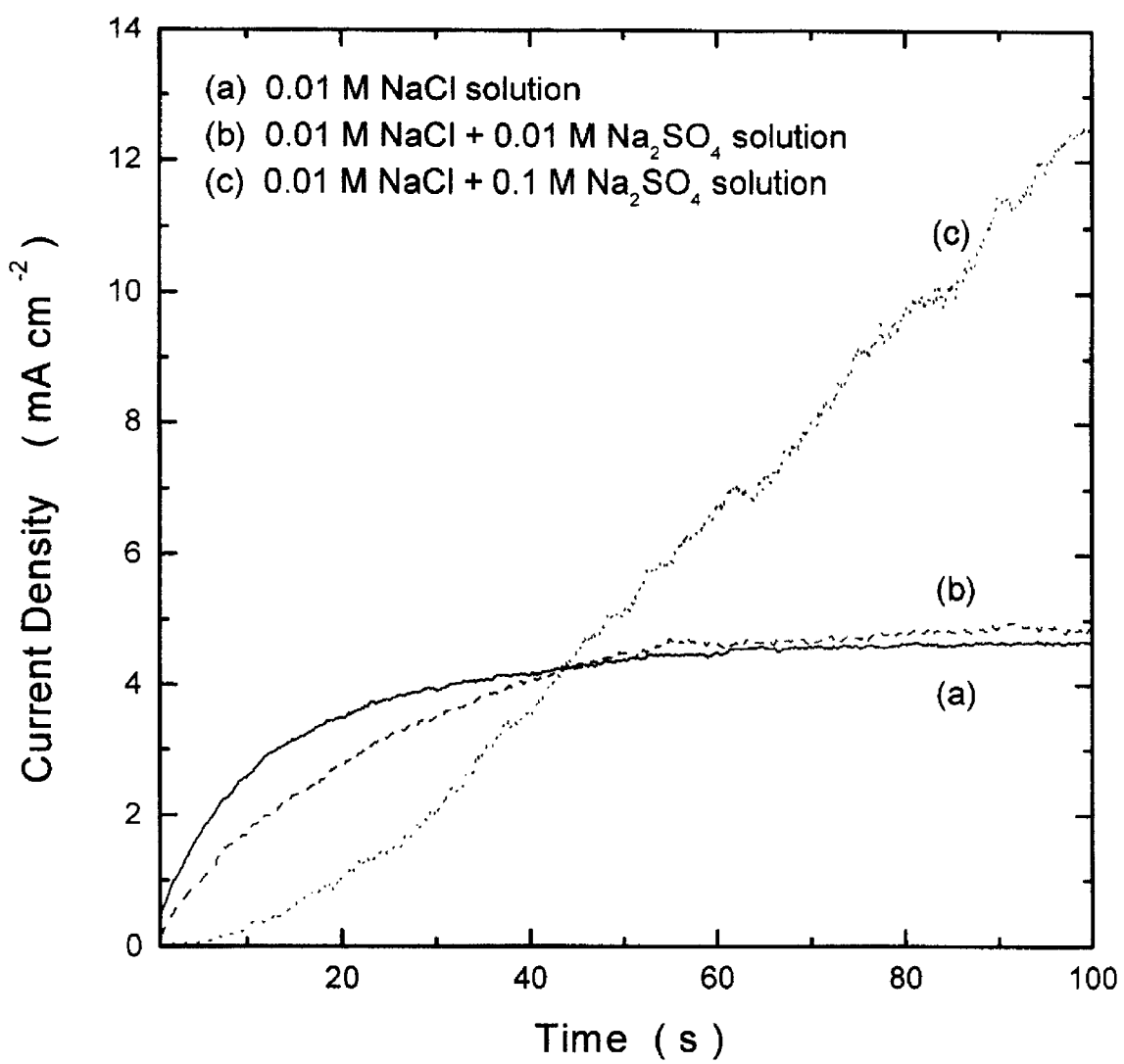
FIG. 4 is a current-to-time curve established when the aluminum electrode formed with the oxide film is etched at an applied anodic potential of +1.0 $V_{SCE}$ and at 60° C.
Figure 5:
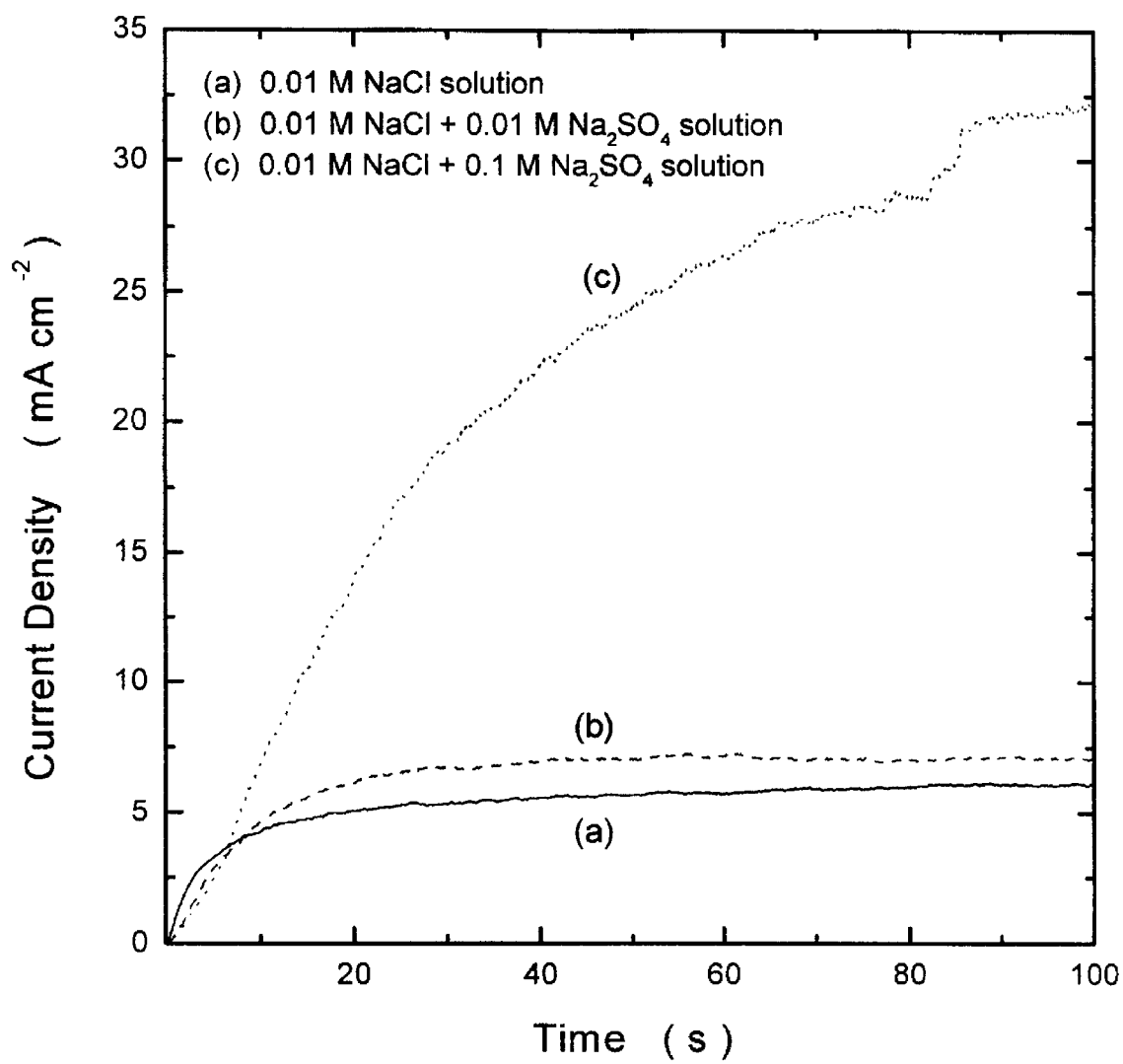
FIG. 5 is a current-to-time curve established when an aluminum electrode formed with an oxide film is etched at an applied anodic potential of +1.0 $V_{SCE}$ and at 80° C.

FIGS. 3 to 5 are graphs respectively depicting a relation between current density and etching time measured when the aluminum electrode formed with the oxide film is etched for 100 seconds in a state dipped in the above mentioned NaCl solutions maintained at different temperatures, that is, 25° C., 60° C., and 80° C. after jumping the applied potential from an open circuit potential to an anodic potential, that is, +1.0 $V_{SCE}$, respectively. This measurement was carried out using a saturated calomel electrode (SCE) and a platinum electrode as a reference electrode and a counter electrode of the electrode system used.

Referring to FIG. 3, it can be found that in all solutions, the anodic current density reaches a peak after gradually increasing with the lapse of time. It is also found that the current density increases at a slow rate in the sulfate ions-containing solution, as compared to the sulfate ion-free solution. This is because the sulfate ions-free solution serve to reduce the number of pits formed at the surface of the electrode. Therefore, it can be found that the sulfate ions, which are added to the chloride ions-containing solution, serve as an inhibitor for pit initiation.

Referring to FIGS. 4 and 5, however, it can be found that an abrupt increase in current density occurs when the solution temperature increases, in the case of adding the sulfate ion concentration of 0.1 M to 0.01M NaCl solution. It can also be found that the area of each current-to-time curve in FIG. 4 or 5 is increased. This means a considerable increase in the etched surface of the aluminum electrode.

Figure 6:
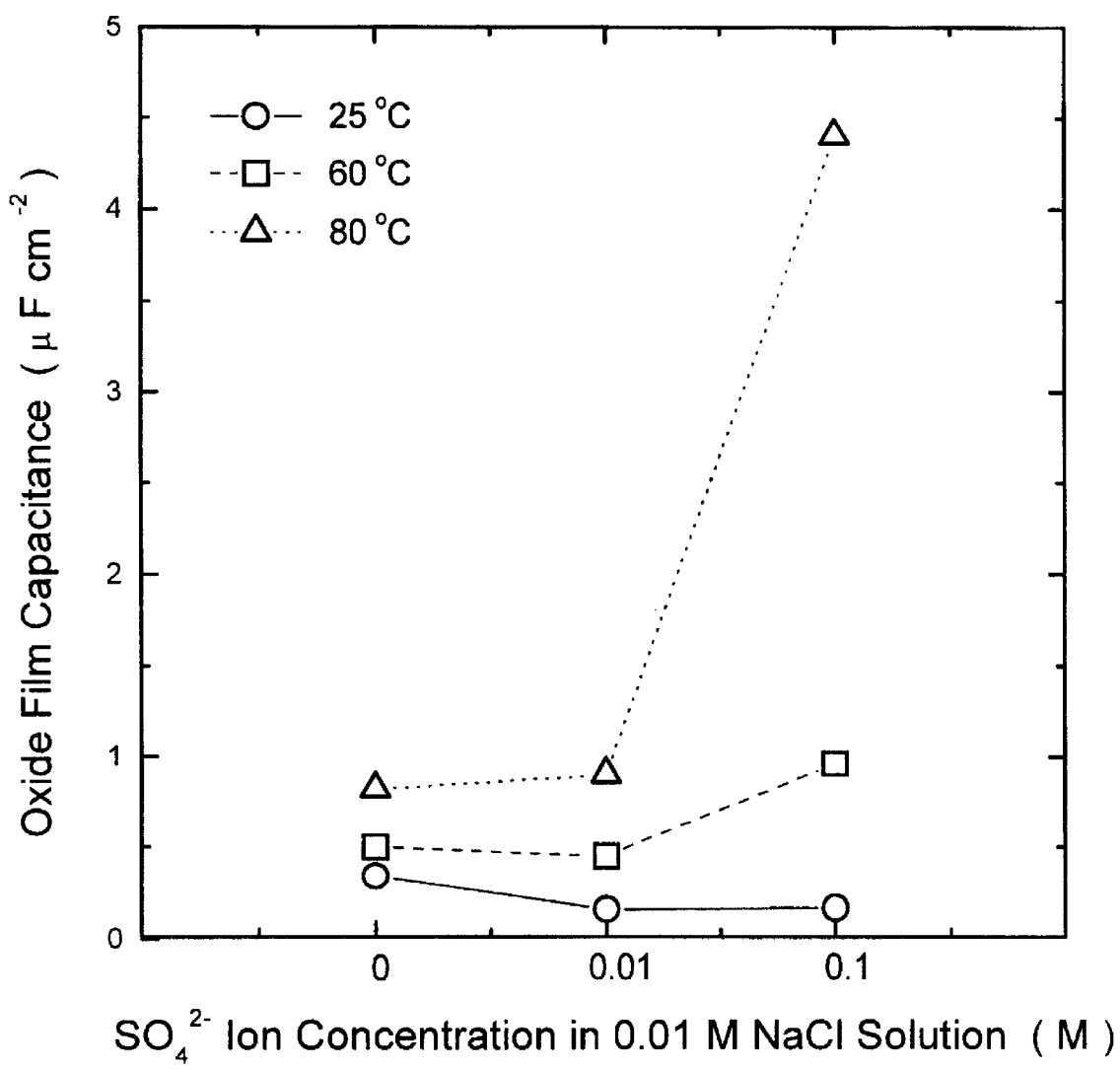
FIG. 6 is a graph depicting a variation in the capacitance of the aluminum electrode according to the present invention, depending on a variation in the temperature of an etching solution used and a variation in the concentration of sulfate ions added to the etching solution.

FIG. 6 is a graph depicting a variation in the capacitance of the aluminum oxide film formed by re-anodizing the aluminum oxide film formed by re-anodizing the aluminum electrode in a mixed solution containing 0.5 M $H_3BO_3$ and 0.05 M $Na_2B_4O_7$, at a current density of 1 mA $cm^{-2}$ until formation voltage of 30 V is reach. With various sulfate ions concentration added to the NaCl solution maintained at different temperatures, that is, 25° C., 60° C., and 80° C., respectively. Referring to FIG. 6, it can be found, as expected from the current-to-time curves of FIGS. 3 to 5, that the aluminum oxide film exhibits an abrupt increase in capacitance in the NaCl solution containing 0.1 M sulfate ions.

The following Table 1 describes respective surface areas calculated based on capacitance measurement for the above mentioned cases using NaCl solutions of different concentrations and different temperatures. Referring to Table 1, it can be found that where the etching solution is maintained at a temperature of 80° C. and has a sulfate ion concentration of 0.1 M, it is possible to obtain an increase in surface area by about 33 times, as compared to the initial surface are of 1 $cm^2$.

TABLE 1

Surface Area Calculated Based on Measured Capacitance
(Unit: $cm^2$, and Initial Surface Area of Sample: 1 $cm^2$)

| Concentration of $SO_4^{2-}$ Ions (M) | Solution Temperature | | |
|---|---|---|---|
| | 25 | 60 | 80 |
| 0 | 2.58 | 3.79 | 6.22 |
| 0.01 | 1.21 | 3.41 | 6.82 |
| 0.1 | 1.29 | 7.28 | 33.35 |

As apparent from the above description, the method of the present invention has an advantage in that the anodization time is relatively short because the re-anodization is conducted preferably only for the etched portion of the aluminum electrode. Also, there is an additional advantage in that an effective tunnel formation reaction is carried out because sulfate ions are absorbed onto the exposed surface portion of the aluminum electrode. Since the re-anodization is carried out after an etching process conducted for an oxide film of an initial thickness, it is possible to accurately measure the increased capacitance and surface area within a reduced period of time, using an AC impedance device. The present invention makes it possible to prepare an anode electrode provided with an oxide film having characteristics of a uniform thickness and a large surface area. Such characteristics can not be expected in conventional aluminum foils used for electrodes of high voltage electrolytic capacitors. In accordance with such characteristics, it is also expected to achieve a great increase in the capacitance of electrolytic capacitors.

What is claimed is:

1. A method for preparing an anode electrode of a high voltage electrolytic capacitor, comprising the steps of:

anodizing an aluminum foil in a boric acid solution, thereby forming an oxide film of a uniform thickness on the aluminum foil;

partially etching the aluminum foil, formed with the oxide film, in an NaCl solution containing sulfate ions; and re-anodizing the etched aluminum foil, thereby forming again an oxide film on the etched aluminum foil.

2. The method according to claim 1, wherein the boric acid solution is a mixed solution of 0.5 M $H_3BO_3$ and 0.05 M $Na_2B_4O_7$.

3. The method according to claim 1, wherein the NaCl solution is a sodium chloride solution containing sulfate ions in a concentration of 0.01 to 0.1 M.

4. The method according to claim 1, wherein the sodium chloride solution is maintained at a temperature of 25 to 80° C.

5. The method according to claim 1, wherein a capacitance and a surface area of the anode electrode are measured using an AC impedance device.

* * * * *